United States Patent
Honda et al.

(10) Patent No.: US 7,684,884 B2
(45) Date of Patent: Mar. 23, 2010

(54) AUDIO PROCESSOR, INPUT/OUTPUT PROCESSING APPARATUS, AND INFORMATION PROCESSING APPARATUS

(75) Inventors: Shinichi Honda, Tokyo (JP); Yoshikazu Takahashi, Saitama (JP); Kaoru Yamanoue, Tokyo (JP); Takashi Toyoda, Tokyo (JP); Nobuo Sasaki, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 184 days.

(21) Appl. No.: 11/830,981

(22) Filed: Jul. 31, 2007

(65) Prior Publication Data
US 2008/0071958 A1 Mar. 20, 2008

(30) Foreign Application Priority Data
Sep. 19, 2006 (JP) .............................. 2006-252775

(51) Int. Cl.
*G06F 17/00* (2006.01)
*G06F 3/00* (2006.01)

(52) U.S. Cl. .............................. 700/94; 710/33; 710/34; 710/48; 710/260

(58) Field of Classification Search .................. 710/260, 710/33, 34, 48; 700/94
See application file for complete search history.

(56) References Cited

U.S. PATENT DOCUMENTS 5,051,981 A * 9/1991 Kline .......................... 370/290
7,474,722 B1 * 1/2009 Chieng et al. ................ 375/355
2002/0007426 A1 * 1/2002 Ando et al. .................... 710/25
2002/0120802 A1 * 8/2002 Knudsen ....................... 710/260
2006/0041895 A1 * 2/2006 Berreth ......................... 719/328

FOREIGN PATENT DOCUMENTS

| JP | 8-292845 | 11/1996 |
|---|---|---|
| JP | 2004-538544 | 12/2004 |
| JP | 2005-143009 | 6/2005 |

OTHER PUBLICATIONS

'The Scientist and Engineer's Guide to Digital Signal Processing' Second Edition By Steven W. Smith, copyright 1997-1999.*

(Continued)

*Primary Examiner*—Henry W. H. Tsai
*Assistant Examiner*—Steven G Snyder
(74) *Attorney, Agent, or Firm*—Katten Muchin Rosenman LLP

(57) ABSTRACT

There is provided an information processing apparatus in which a CPU and an audio processing unit are coupled by a bus. The audio processing unit includes a ring buffer that temporarily retains audio data, and performs an input/output process of the audio data. An interrupt signal generator generates a buffer empty signal, when the audio data is output from a buffer in the ring buffer and the buffer is empty, decimates the buffer empty signal in accordance with a sampling frequency of audio, and then feeds the interrupt signal that survives the decimation to the CPU. The CPU, upon receiving the buffer empty signal, issues a DMA transfer instruction for writing the audio data into the empty buffer in the ring buffer.

10 Claims, 6 Drawing Sheets

OTHER PUBLICATIONS

'The Scientist and Engineer's Guide to Digital Signal Processing' Second Edition by Steven W. Smith, copyright 1997-1999.*

Decision of Refusal dated Oct. 14, 2008, from the corresponding Japanese Application.

John Regehr, et al., "Preventing Interrupt Overload", Proceedings of the ACM Conference on Languages, Compilers, and Tools for Embedded Systems, May 2, 2005, pp. 1-9, Chicago, Illinois, USA, retrieved from the Internet on Nov. 29, 2007.

Biswas Amitava, "Masters Thesis—Chapter 8: Related Work and Contributions", 2005, pp. 194-212, Montreal, Canada, retrieved from the Internet on Nov. 29, 2007.

ATT Avionics Ltd., "ATT PIM AVR1: Protocol Interface Module Panavia Single Channel Receiver", May 19, 2006, Somerset, England, retrieved from the Internet on Nov. 29, 2007.

Extended European Search Report dated Dec. 20, 2007, for corresponding European Application EP 07 01 6120.

Notification of Reason(s) for Refusal mailed Jul. 22, 2008 from the corresponding Japanese Application No. 2006-252775.

* cited by examiner

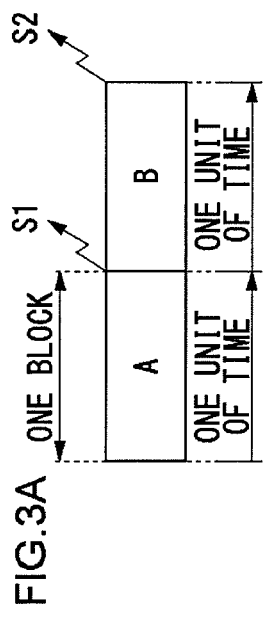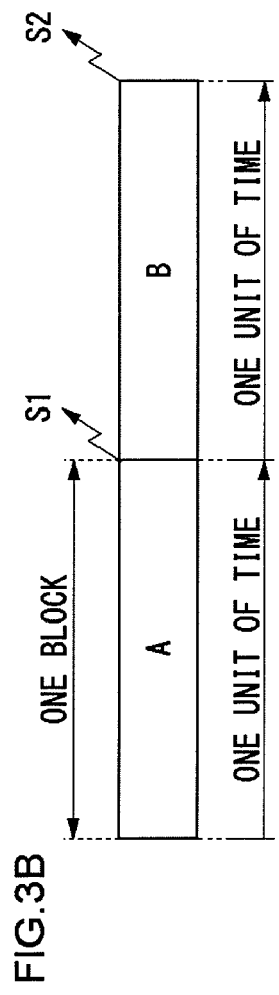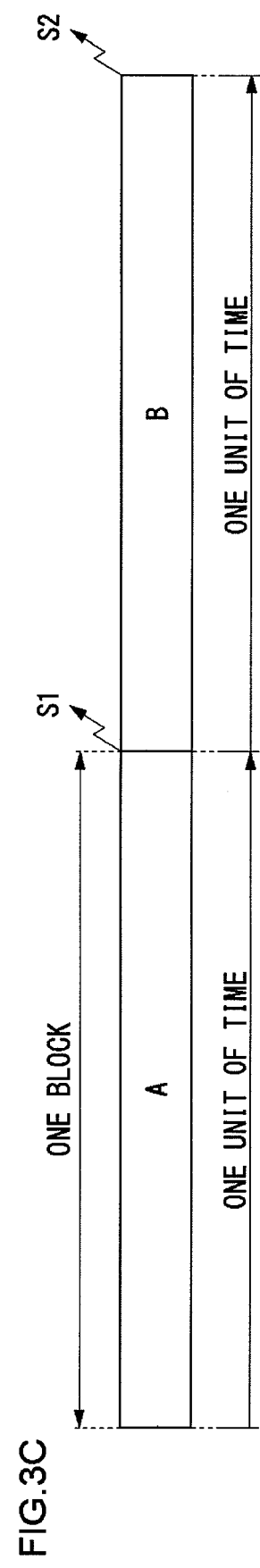

AUDIO PROCESSOR, INPUT/OUTPUT PROCESSING APPARATUS, AND INFORMATION PROCESSING APPARATUS

BACKGROUND OF THE INVENTION

1. Field of the Invention

This invention relates to data input/output processors and, in particular, to an audio processing apparatus and information processing apparatus that perform an input/output process of audio data.

2. Description of the Related Art

The Central Processing Unit (CPU) frequently reads image data or audio data from a main memory or writes the data into the main memory in an information processing apparatus such as a game console. In order to reduce the load on the CPU, Direct Memory Access (DMA) transfer is performed to transfer data between the main memory and an input/output device used for audio or video data. The DMA transfer is a method of accomplishing the data transfer between the main memory and the input/output device at high speed without the intervention of the CPU.

When the data stored in the buffer in the input/output device is consumed, data needs to be newly transferred between the main memory and the input/output device. When the buffer is in an empty state or in a full state, the input/output device sends an interrupt signal to the CPU. The CPU that has received the interrupt signal issues a DMA transfer instruction, and then data is newly exchanged between the main memory and the input/output device.

In a system where the DMA transfer is initiated by an interruption, whenever an interruption to the CPU is generated, the CPU needs to initiate an interrupt process. Thus, the increased number of interruptions increases the load on the CPU. Also, in the case where plural interrupt signals contend for a single interrupt signal line, interrupt signals generated simultaneously cause a delay in the propagation of the interrupt signals. It takes time for the propagation and processing of the interrupt signal under the above-described circumstances where plural interrupt signals are generated. The period from when an interrupt signal is generated and is then propagated to when the interrupt processing is completed, namely, the latency is increased, the issue of the DMA transfer instruction is delayed, and the efficiency of the data transfer process is degraded.

SUMMARY OF THE INVENTION

The present invention has been made in view of the above circumstances, and has a general purpose of providing a data transfer technique whereby the frequency of the interrupt signal generated can be reduced and the data transfer efficiency can be improved.

In order to address the above problem, an aspect of the present invention is an information processing apparatus in which a processor and an audio processing unit are coupled by a bus, wherein the audio processing unit comprises: a ring buffer which includes a plurality of buffers for temporarily storing audio data to be output to an external destination; and an interrupt signal generator which decimates interrupt signals, each of which indicates that the data is output from a buffer in the ring buffer and the buffer is in an empty state, in accordance with a sampling frequency of the audio data to be output to the external destination, and supplies the interrupt signals that survive the decimation to the processor; and wherein the processor issues a data transfer instruction for writing the audio data into the buffer in the empty state in the ring buffer, when receiving the interrupt signal that survives the decimation.

Another aspect of the present invention is an information processing apparatus in which a processor and an audio processing unit are coupled by a bus, wherein the audio processing unit comprises: a ring buffer which includes a plurality of buffers for temporarily storing audio data to be input from an external source; and an interrupt signal generator which decimates interrupt signals, each of which indicates that the data is input into a buffer in the ring buffer and the buffer is in a full state, in accordance with a sampling frequency of the audio data to be input from the external source, and supplies the interrupt signals that survive the decimation to the processor; and wherein the processor issues a data transfer instruction for reading the audio data from the buffer in the full state in the ring buffer, when receiving the interrupt signal that survives the decimation.

Yet another aspect of the present invention is an information processing apparatus in which a processor and an input and output processing unit are coupled by a bus, wherein the input and output processing unit comprises: a ring buffer which includes a plurality of buffers for temporarily storing data to be output to an external destination; and an interrupt signal generator which decimates interrupt signals, each of which indicates that the data is output from a buffer in the ring buffer and the buffer is in an empty state, in accordance with an output speed of the audio data to be output to the external destination, and supplies the interrupt signals that survive the decimation to the processor; and wherein the processor issues a data transfer instruction for writing the data into the buffer in the empty state in the ring buffer, when receiving the interrupt signal that survives the decimation.

Further another aspect of the present invention is an information processing apparatus in which a processor and an input and output processing unit are coupled by a bus, wherein the input and output processing unit comprises: a ring buffer which includes a plurality of buffers for temporarily storing data to be input from an external source; and an interrupt signal generator which decimates interrupt signals, each of which indicates that the data is input into a buffer in the ring buffer and the buffer is in a full state, in accordance with an output speed of the audio data to be input from the external source, and supplies the interrupt signals that survive the decimation to the processor; and wherein the processor issues a data transfer instruction for writing the data into the buffer in the full state in the ring buffer, when receiving the interrupt signal that survives the decimation.

Optional combinations of the aforementioned constituting elements, and implementations of the invention in the form of methods, processors, apparatuses, systems, recording media, computer programs, data structures, etc. may also be practiced as additional may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3A through FIG. 3C show cases where there are provided double buffers each having a specific size for each sampling frequency;

DETAILED DESCRIPTION OF THE INVENTION

The invention will now be described by reference to the preferred embodiments. This does not intend to limit the scope of the present invention, but to exemplify the invention.

Figure 1:
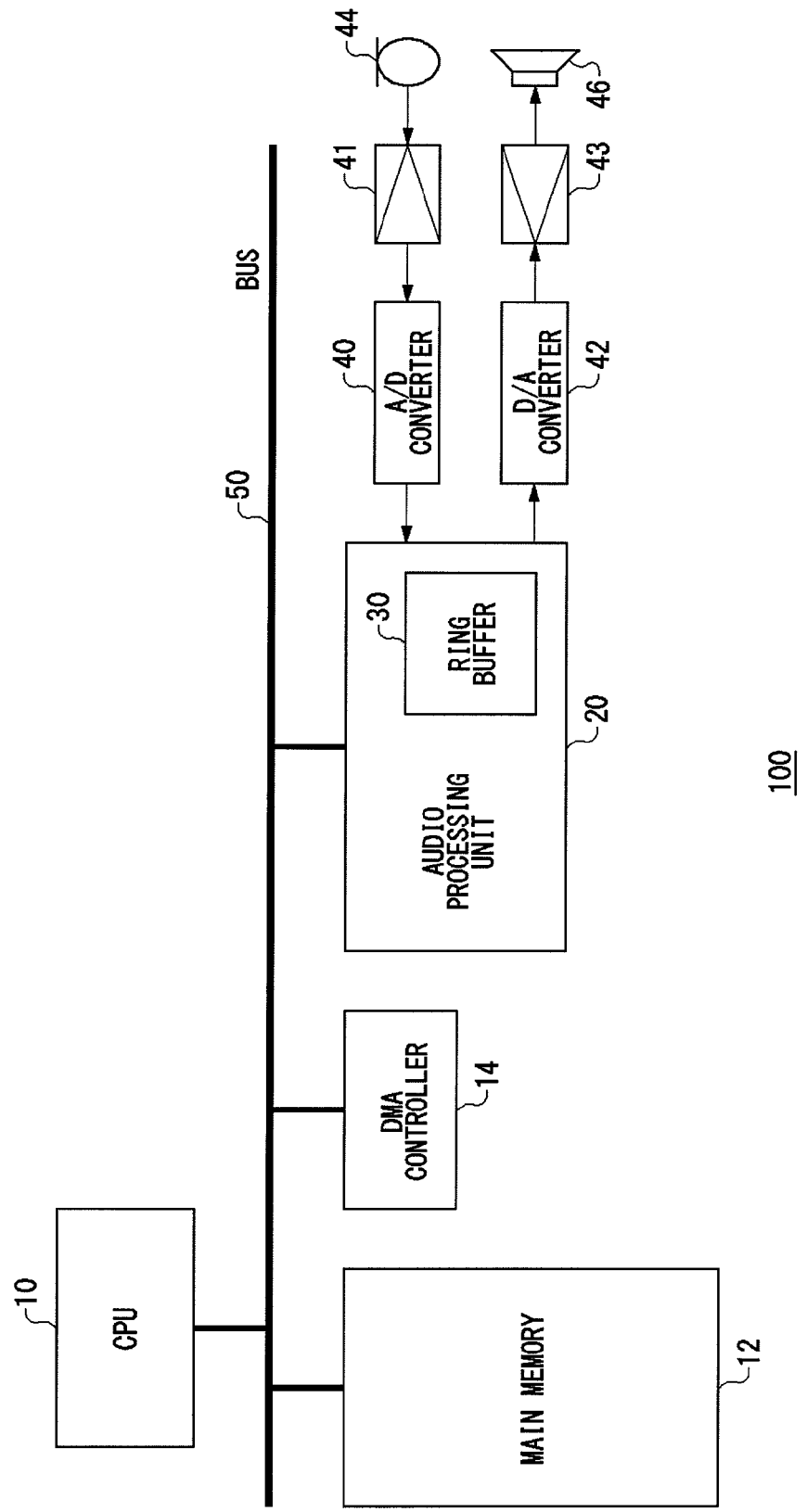
FIG. 1 shows a block diagram of an information processing apparatus according to an embodiment of the present invention.

FIG. 1 shows a block diagram of an information processing apparatus 100 according to an embodiment of the present invention. A CPU 10, a main memory 12, a DMA controller 14, and an audio processing unit 20 are connected with each other by a bus 50.

The CPU 10 may be a multiprocessor or may be a multi-core processor where plural processor cores are integrated into a single package. The audio processing unit 20 may be integrally formed with the CPU 10 such that the audio processing unit 20 is connected to the CPU 10 and other parts by an internal bus, or may be formed as a sound card connected by a bus for connecting peripheral equipment such as a Peripheral Components Interconnect (PCI) bus.

The audio processing unit 20 includes a ring buffer 30 for retaining audio data temporarily, and performs an input/output process of the audio data. The ring buffer 30 is respectively provided for audio input and audio output and formed separately from each other.

For audio output, audio data in the ring buffer 30 for audio output is converted into an analog signal by a D/A converter 42, is amplified by an amplifier 43, and is then output from a speaker 46. For audio input, the analog signal input into a microphone 44 is amplified by an amplifier 41, is converted into a digital signal by an A/D converter 40, and is then accumulated in the ring buffer 30 for audio input.

In this case, the DMA controller 14 is depicted as an independent unit; however, the DMA controller 14 may be included in the CPU 10, or may be included in the audio processing unit 20.

There is provided an interrupt signal line between the audio processing unit 20 and the CPU 10, so the audio processing unit 20 is capable of sending various interrupt signals such as Buffer Empty or Buffer Full, to the CPU 10 via the interrupt signal line. The interrupt signal line may be provided for each of the buffer empty signal and the buffer full signal. The logical OR operation of the interrupt signals on plural interrupt signal lines may be performed so that the result of the logical OR operation may be sent to the CPU 10 via a single interrupt signal line.

The process flow of the audio output will now be described briefly. The audio data processed by the CPU 10 is stored in the main memory 12. The DMA controller 14 performs the DMA transfer of the audio data stored in the main memory 12 to an empty buffer in the ring buffer 30 in accordance with a DMA transfer instruction given by the CPU 10.

The audio processing unit 20 reads out the audio data stored in the ring buffer 30, and outputs the audio data to the D/A converter 42 in synchronization with the audio sampling frequency. When the audio data is output from the buffer being read in the ring buffer 30 and the buffer is in an empty state, the audio processing unit 20 generates a buffer empty signal and supplies the signal to the CPU 10 via the interrupt signal line.

The CPU 10, having received the buffer empty signal, issues a DMA transfer instruction to the DMA controller 14, the DMA transfer instruction designating a transfer source address of the main memory 12 and a transfer destination address of the ring buffer 30. The DMA controller 14 performs the DMA transfer of the audio data stored in the main memory 12 to an empty buffer of the ring buffer 30 in accordance with the DMA transfer instruction issued by the CPU 10. In this manner, the audio data generated by the CPU 10 is successively transferred to the audio processing unit 20, and is output from the speaker 46 by way of the D/A converter 42.

The process flow of the audio output will next be described briefly. The audio signal input from the microphone 44 is converted into digital data by the A/D converter 40, and is accumulated in an empty buffer of the ring buffer 30. When the empty buffer becomes filled with data, the audio processing unit 20 generates a buffer full signal (also known as buffer filled signal) and the signal is fed to the CPU 10 via the interrupt signal line.

The CPU 10, having received the buffer full signal, issues a DMA transfer instruction to the DMA controller 14, the DMA transfer instruction designating a transfer source address of the ring buffer 30 and a transfer destination address of the main memory 12. The DMA controller 14 performs the DMA transfer of the audio data accumulated in the buffer in a full state in the ring buffer 30 to the main memory 12 in accordance with the DMA transfer instruction issued by the CPU 10. In this manner, the audio signal input from the microphone 44 is accumulated in the ring buffer 30 via the A/D converter 40, is successively transferred from the audio processing unit 20 to the CPU 10, and is then processed.

At the time of audio output, the buffer empty signal is sent from the audio processing unit 20 to the CPU 10 via an interrupt signal line. As the audio sampling frequency becomes greater, the speed at which the audio data is read from the buffer is increased. This increases the frequency of the buffer empty signal generated.

If buffer empty signals are frequently generated, the buffer empty signals will contend with the other interrupt signals transmitted over the same interrupt signal line and a delay will occur in the propagation of the interrupt signals. In addition, since the CPU 10 has to process a number of interrupt signals, the load applied to the CPU 10 will be increased and it will take more time for processing the interruption. Accordingly, this will increase the time from when an interrupt signal is generated and the CPU 10 receives the interrupt signal to when the interrupt processing is ended. To put in other words, the latency in the interrupt signal processing will be prolonged. This will cause the CPU 10 to delay the issuing of the DMA transfer instruction. Subsequently, writing of the audio data into an empty buffer will be delayed and buffer underflow will occur causing a gap or discontinuity in the audio output and degradation in the audio reproduction quality.

Also at the time of audio input, a similar problem occurs. The buffer full signal is sent from the audio processing unit 20 to the CPU 10 via the interrupt signal line. As the audio sampling frequency becomes greater, the speed at which the audio data is written into the buffer is increased. This increases the frequency of the buffer full signal generated. The latency in processing the buffer full signal will be prolonged. This will cause the CPU 10 to delay the issuing of the DMA transfer instruction. Subsequently, reading of the audio data from the buffer will be delayed and buffer overflow will occur causing an undesirable situation such that audio input will be disabled and audio data will be dropped.

Therefore, in order to suppress the frequency of the buffer empty signal or buffer full signal transferred from the audio processing unit 20 to the CPU 10, the audio processing unit 20 decimates these interrupt signals and then feeds the interrupt signals that survive the decimation to the CPU 10.

Figure 2:
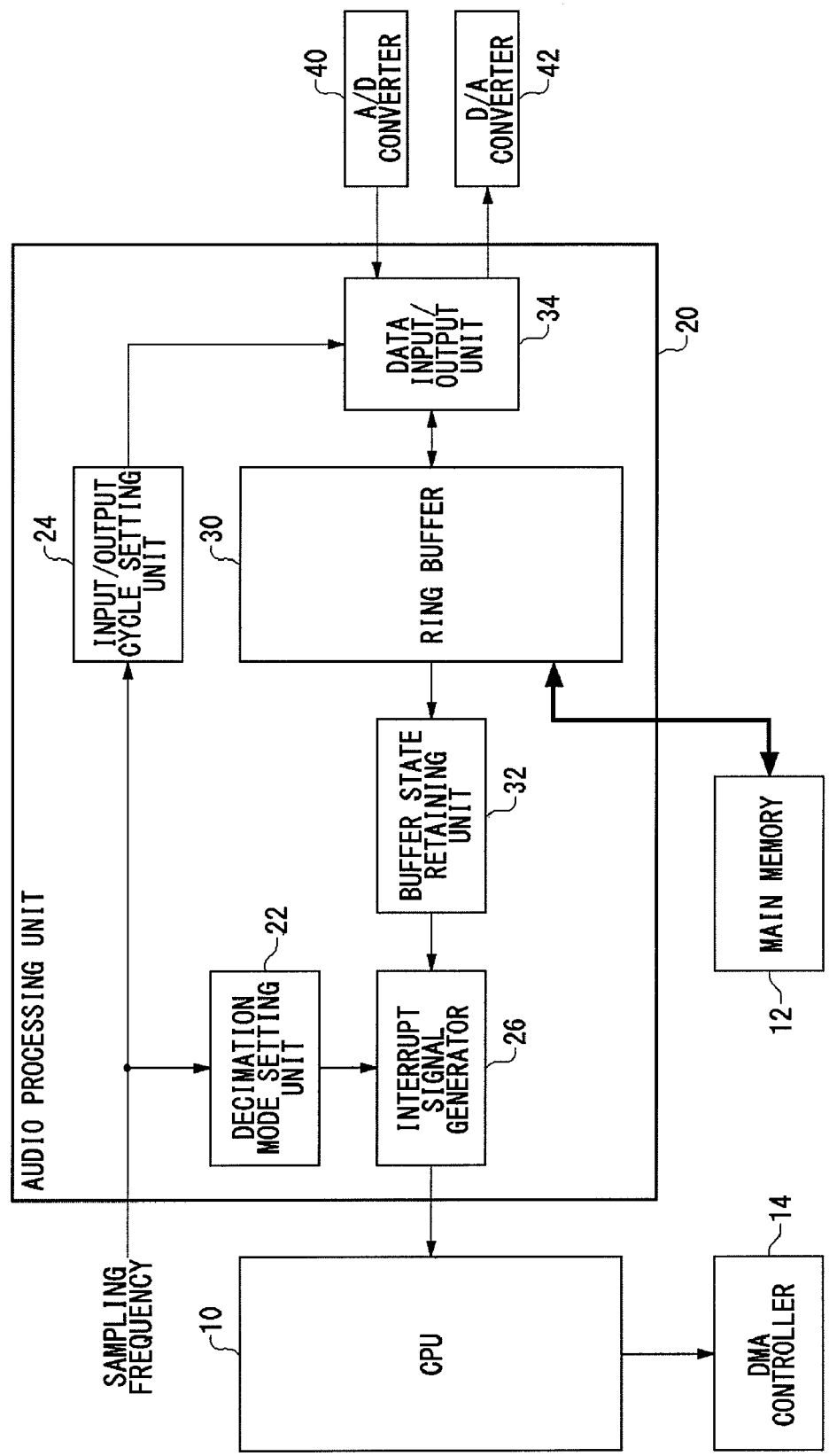
FIG. 2 shows a detailed block diagram of an audio processing unit of FIG. 1.

FIG. 2 shows a detailed block diagram of the audio processing unit 20. The figure shows a block diagram, focusing on functions. Each of the functional blocks therein is implemented by only hardware, only software, or optional combinations thereof.

The audio processing unit 20 includes: a decimation mode setting unit 22; input/output cycle setting units 24; an interrupt signal generator 26; the ring buffer 30; a buffer state retaining unit 32; and a data input/output unit 34. The ring buffer 30 is respectively provided for audio output and audio input and separately formed from each other; however, the figure shows only one ring buffer 30 for brevity.

A description will first be given of the operations of components at the time of audio output. The audio processing unit 20 receives information on the sampling frequency of the audio currently processed by the CPU 10. The decimation mode setting unit 22 sets a decimation mode in accordance with the sampling frequency of audio output, and supplies information on the decimation mode thus set to the interrupt signal generator 26.

For example, it is assumed that 48 kHz, 96 kHz, and 192 kHz are possible candidates for the audio sampling frequency. 48 kHz is a sampling frequency for use in the reproduction of a music DVD or the reproduction of sound in a game application. 192 kHz is a sampling frequency for use in audio reproduction of high-quality images recorded in a DVD. 48 kHz is referred to as "basic sampling frequency", 96 kHz is referred to as "double sampling frequency", and 192 kHz is referred to as "quadruple sampling frequency".

In the above case, 1 mode, ½ mode, and ¼ mode are respectively provided for the basic sampling frequency, the double sampling frequency, and the quadruple sampling frequency, as the decimation modes. The decimation modes are different from each other in the rate of decimating the interrupt signals. The 1 mode is a mode in which no interrupt signals are decimated. The ½ mode is a mode in which the interrupt signals remain at the rate of one out of two and the rest thereof is decimated. The ¼ mode is a mode in which the interrupt signals remain at the rate of one out of four and the rest thereof is decimated.

In this manner, the decimation mode setting unit 22 increases the decimation rate of the interrupt signal, as the audio sampling frequency is increased from single to double and quadruple the original one, so that the number of the interrupt signals is decreased from single to half and one-forth thereof, respectively.

The ring buffer 30 has a data structure in which the head and the tail are connected to form a ring in an arrangement of plural buffers each having a fixed length. In particular, when there are two buffers, it is called a double buffer.

The ring buffer 30 includes: a read pointer indicating a point from which data is read; and a write pointer into which data is written. The write pointer is located ahead of the read pointer, and effective data, namely, data in the read queue is stored in a region delimited by the start position indicated by the read pointer and the end position indicated by the write pointer. When reading of data from a buffer in the ring buffer 30 is completed, the buffer enters an empty state. The buffer state retaining unit 32 retains the state of whether or not each of the buffers constituting the ring buffer 30 is empty.

The interrupt signal generator 26 refers to the state of whether or not the buffer is empty retained in the buffer state retaining unit 32. Every time a buffer in the ring buffer 30 enters the empty state, the interrupt signal generator 26 generates a buffer empty signal. After decimating the buffer empty signals thus generated in accordance with the decimation mode set by the decimation mode setting unit 22, the interrupt signal generator 26 feeds the buffer empty signals that survive the decimation to the CPU 10 via the interrupt signal line.

Upon receiving the buffer empty signal, the CPU 10 gives to the DMA controller 14 a DMA transfer instruction having the transfer source address and the transfer destination address, the transfer source address being the start address of the main memory 12 in which an audio data block to be transferred next is stored, the transfer destination address being the start address of the empty buffer in the ring buffer 30. The DMA controller 14 transfers the audio data block from the source address of the main memory 12 to the destination address of the ring buffer 30. With this, a new audio data block is stored in the empty buffer of the ring buffer 30.

The input/output cycle setting unit 24 sets the output frequency in accordance with the sampling frequency of audio to be output, and posts the output timing of the data to the data input/output unit 34 in accordance with the clock. The data input/output unit 34 reads the audio data block from the buffer in the ring buffer 30 in synchronization with the output timing posted by the input/output cycle setting unit 24, and supplies the audio data block to the D/A converter 42. When the data input/output unit 34 finishes reading the audio data block from the buffer in the ring buffer 30, the buffer enters the empty state.

A description will next be given of the operations of the components in the case of audio input. The operations of the components for audio input are basically the same as those for audio output except that the direction of the data flow is reversed. Thus, a description will be given briefly.

The decimation mode setting unit 22 sets the decimation mode in accordance with the sampling frequency of audio to be input, and feeds the information on the decimation mode that has been set to the interrupt signal generator 26.

The buffer state retaining unit 32 retains the state of whether or not each of the buffers in the ring buffer 30 for audio input is full. Every time the audio data is written into a buffer in the ring buffer 30 and the buffer enters the full state, the interrupt signal generator 26 generates a buffer full signal. After decimating the buffer full signals thus generated in accordance with the decimation mode set by the decimation mode setting unit 22, the interrupt signal generator 26 feeds the buffer full signals that survive the decimation to the CPU 10 via the interrupt signal line.

The input/output cycle setting unit 24 sets an input cycle in accordance with the sampling frequency of audio to be input, and posts the input timing of the data to the data input/output unit 34 in accordance with the clock. The data input/output unit 34 writes the audio data block fed by the A/D converter 40 into an empty buffer in the ring buffer 30 in accordance with the input timing posted by the input/output cycle setting unit 24. When the data input/output unit 34 finishes writing the audio data block into the empty buffer in the ring buffer 30, the buffer enters a full state.

Upon receiving a buffer full signal, the CPU 10 gives to the DMA controller 14 a DMA transfer instruction having the transfer source address and the transfer destination address, the transfer source address being the start address of the buffer in the full state in the ring buffer 30, the transfer destination address being the start address of the region in the main memory 12 to which the audio data block is to be stored. The DMA controller 14 transfers the audio data block from the source address of the ring buffer 30 to the destination address of the main memory 12. In this manner, the audio data block is read from the buffer in the full state in the ring buffer 30, and is then transferred to the CPU 10.

Hereinafter, a description will be given in detail of a decimation process of the buffer empty signal or buffer full signal, performed by the interrupt signal generator 26 of FIG. 2. In order to facilitate an understanding of the need of the decimation process of the interrupt signals, the problem that occurs when the decimation process is not performed will first be described with reference to FIG. 3A to FIG. 5C. Then, the decimation process of the interrupt signals will be described with reference to FIG. 6A to FIG. 6C. The decimation process for the audio output is the same as that of the audio input except that the direction of the data flow is reversed. Therefore, the decimation process of the buffer empty signal in the case of audio output will hereinafter be described.

FIG. 3A to FIG. 3C are diagrams for explaining the case where there are provided double buffers each having a specific size for each sampling frequency. Referring to FIG. 3A, in the case of the basic sampling frequency, a double buffer is configured by providing two buffers each having a size where one block of audio data can be stored.

The data input/output unit 34 reads the audio data for one block from a first buffer A at a speed in accordance with the basic sampling frequency. The time that it takes to read out the one block of audio data is referred to as "one unit of time". After one unit of time elapsed, the first buffer A enters the empty state and a first interrupt signal S1 is generated.

The CPU 10, having received the first interrupt signal S1, writes a new audio data block into the first buffer A. Meanwhile, the data input/output unit 34 reads the next one block of audio data from a second buffer B. When one unit of time elapsed and the second buffer B becomes an empty buffer, a second interrupt signal S2 is generated. The CPU 10, having received the second interrupt signal S2, writes the new block of audio data into the second buffer B. The data input/output unit 34 returns to the first buffer A and reads one block of audio data. In this way, the audio data block is read and written, while the buffer A and the buffer B are being alternately switched.

It is assumed that one block of audio data is composed of 32 samples. Since the basic sampling frequency is 48 kHz, the time that it takes to read out one block of audio data, namely, one unit of time is 667 microseconds (1/48000×32=667).

Likewise, in the case of the double sampling frequency, referring to FIG. 3B, the double buffer is configured by providing two buffers each having a size where one block of audio data can be stored. Since the sampling frequency is doubled, the number of samples in one block is doubled. This doubles the buffer size required. Although the buffer size is doubled, the data input/output unit 34 reads out data at double speed. Therefore, the time that it takes to read one block of audio data from the first buffer A is one unit of time, which is the same as that of the basic sampling frequency.

Since one block of audio data is composed of 64 samples in the case where the sampling frequency is 96 kHz, the time that it takes to read out one block of audio data, namely, one unit of time is 667 microseconds (1/96000×64=667). This is the same as that of the basic sampling frequency.

One block of audio data is read from the first buffer A at a speed in accordance with the double sampling frequency. When one unit of time elapsed and the first buffer A is in the empty state, the first interrupt signal S1 is generated. The next one block of audio data is read from the second buffer B. When one unit of time elapsed and the second buffer B is in the empty state, the second interrupt signal S2 is generated.

As described, in the case where there is provided the double buffer each having a doubled buffer size in accordance with the double sampling frequency, the frequency of the interrupt signal generated is the same in that one block of audio data is read out in every unit of time and the interrupt signal is generated.

In the case of the quadruple sampling frequency, referring to FIG. 3C, the two buffers A and B respectively quadruple the size of the basic sampling frequency. Likewise, the interrupt signal is generated in every unit of time.

As shown in FIG. 3A to FIG. 3C, even if the sampling frequency is greater, the frequency of the interrupt signal generated is not changed by enlarging the buffer size according to the sampling frequency. This prevents a situation where the interrupt signal is frequently generated. Providing plural double buffers each having a specific size for each sampling frequency, however, has disadvantages in that the hardware scale is increased and the production cost is also increased.

Consequently, in order to suppress the amount of memory to be provided, it is conceivable to provide one ring buffer to be commonly used for buffering audio data at various sampling frequencies. If the ring buffer is commonly used for buffering the different sampling frequencies, there will be an issue of determining to which sampling frequency the size of each of the buffers constituting the ring buffer should be adjusted. One solution therefor is that the buffer size is adjusted to the basic sampling frequency, as will be described with reference to FIG. 4A to FIG. 4C. Another solution therefor is that the buffer size is adjusted to the quadruple sampling frequency, as will be described with reference to FIG. 5A to FIG. 5C.

Figure 4A:
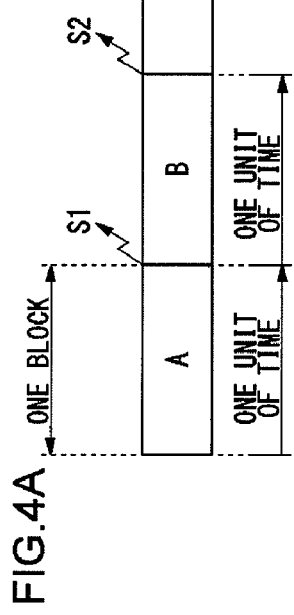
FIG. 4A through FIG. 4C show cases where the size of each of the buffers constituting a ring buffer is adjusted to a basic sampling frequency.
Figure 4B:
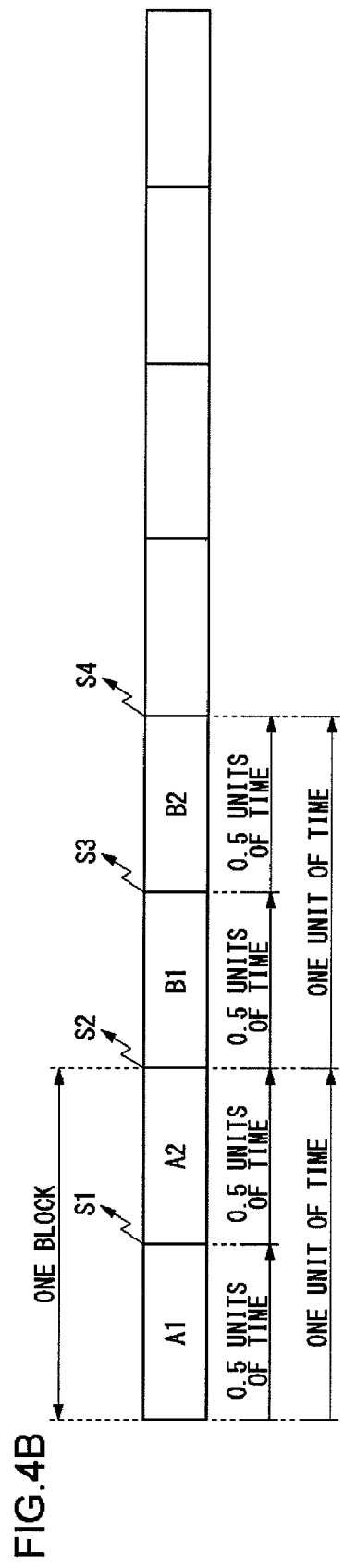
Figure 4C:
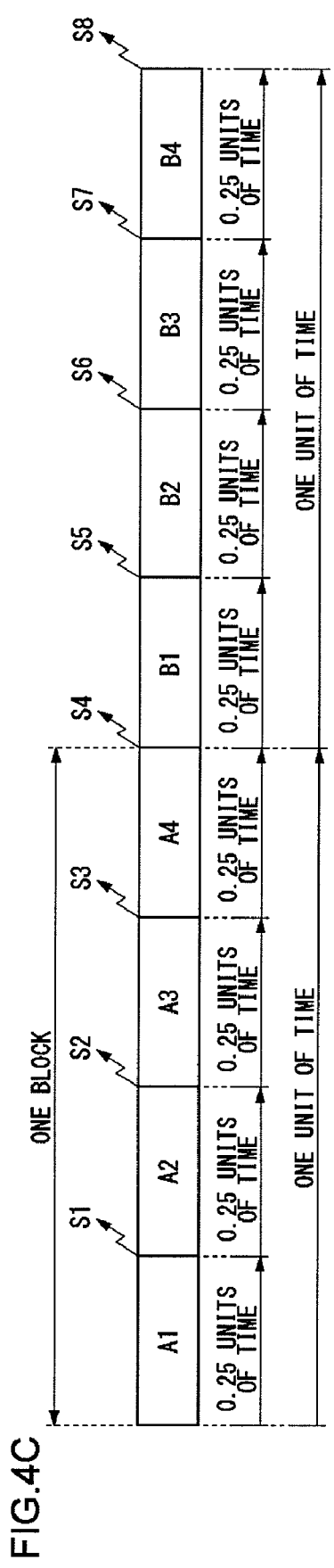

FIG. 4A to FIG. 4C are diagrams for explaining the case where the size of each of the buffers constituting the ring buffer is adjusted to the basic sampling frequency. The ring buffer includes eight buffers each having a size where only one block (32 samples) of audio data at the basic sampling frequency can be stored.

When the audio data having the basic sampling frequency is buffered in the ring buffer, initial two buffers A and B out of eight buffers may be cyclically used as shown in FIG. 4A, or eight buffers including the remaining six buffers may be cyclically used. When one block of audio data stored in the first buffer A is read in one unit of time, the first interrupt signal S1 is generated. Subsequently, when one block of audio data stored in the second buffer B is read in one unit of time, the second interrupt signal S2 is generated.

When the audio data having the double sampling frequency is buffered in the above ring buffer, four out of eight buffers are used as shown in FIG. 4B. Initial two buffers A1 and A2 are handled together as the first buffer and next two buffers B1 and B2 are handled together as the second buffer, so that the first buffer and the second buffer are cyclically used. In a similar manner to FIG. 4A, the remaining four buffers may also be used.

The data input/output unit 34 reads one block of audio data stored in the first buffer (the buffers A1 and A2) in one unit of time. When the initial 0.5 units of time elapsed, the buffer A1 becomes an empty buffer and the first interrupt signal S1 is generated. When another 0.5 units of time elapsed, the buffer A2 becomes an empty buffer and the second interrupt signal S2 is generated.

When the first interrupt signal S1 is generated, the buffer area where one block of audio data having the double sampling frequency can be stored is not in the empty state yet.

This does not allow the CPU 10 to initiate the transfer of a new audio data block. Therefore, the CPU 10 ignores the first interrupt signal S1, even if the CPU 10 has received it. After receiving the second interrupt signal S2 to be generated when one unit of time elapses, the CPU 10 transfers a new audio data block to the first buffer (empty buffers A1 and A2).

In a similar manner, when the data input/output unit 34 reads the next one block of audio data from the second buffer (the buffers B1 and B2) in one unit of time, a third interrupt signal S3 is generated when 0.5 units of time elapsed. When another 0.5 units of time elapsed, a fourth interrupt signal S4 is generated. The processor ignores the third interrupt signal S3. After the fourth interrupt signal S4 is received, a new audio data block is transferred to the second buffer (empty buffers B1 and B2).

As stated, in the case where the size of each of the buffers constituting the ring buffer is adjusted to the basic sampling frequency, if the audio data having the double sampling frequency is buffered, an interrupt signal is generated in every 0.5 units of time. One out of two interrupt signals is considered as useless traffic. 0.5 units of time is a period of time while data of 32 samples, which is half of 64 samples in one block, is read out, and is equal to 333 microseconds (1/96000×32=333).

Likewise, in the case of the quadruple sampling frequency, four buffers A1, A2, A3, and A4 are handled together as the first buffer, next four buffers B1, B2, B3, and B4 are handled together as the second buffer, so that the first buffer and the second buffer are used as the double buffer.

When the initial 0.25 units of time elapsed, while the data input/output unit 34 is reading out one block of audio data stored in the first buffer (the buffers A1, A2, A3, and A4) in one unit of time, the buffer A1 becomes an empty buffer and the first interrupt signal S1 is generated. Subsequently, whenever another 0.25 units of time elapses, the buffers A2 through A4 become empty buffers and the second through fourth interrupt signals S2 through S4 are respectively generated.

As described, if the ring buffer composed of the buffers each having the size adjusted to the basic sampling frequency is employed for buffering the audio data of the quadruple sampling frequency, an interrupt signal is generated in every 0.25 units of time and three out of four interrupt signals are considered as useless traffic. 0.25 units of time is a period of time while data of 32 samples, which equals to one-fourth of 128 samples in one block, is read out, and is equal to 167 microseconds (1/192000×32=167). If an interrupt signal of buffer empty is generated in every 167 microseconds, there will be more possibility of contending with the other interrupt signals over the interrupt signal line and the load for processing the interrupt signals on the CPU 10 will be increased. This will significantly affect the latency in processing of the interrupt signals.

As described with reference to FIG. 4A to FIG. 4C, if the ring buffer composed of the buffers each having the size adjusted to the basic sampling frequency is employed for buffering the audio data of the double or quadruple sampling frequency, useless interrupt signals will be generated. For this reason, it is conceivable to reduce the frequency at which the interrupt signal is generated by enlarging the size of each of the buffers constituting the ring buffer and adjusting the size to the quadruple sampling frequency. This case, however, will pose another problem.

Figure 5A:
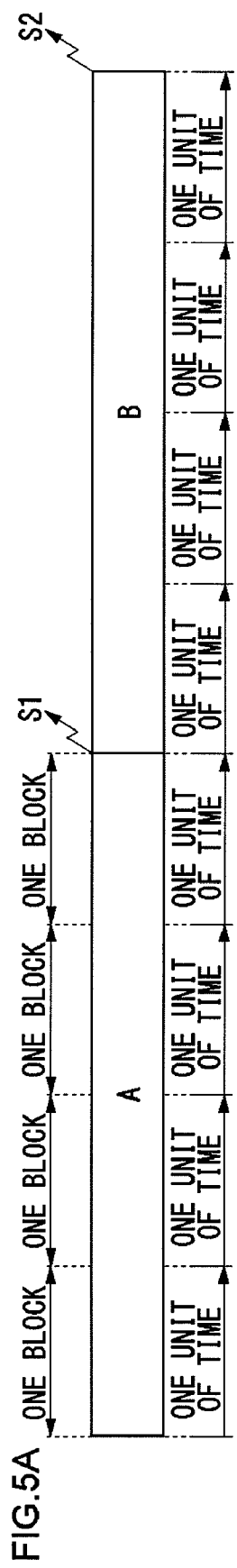
FIG. 5A through FIG. 5C show cases where the size of each of the buffers constituting the ring buffer is adjusted to a quadruple sampling frequency.
Figure 5B:
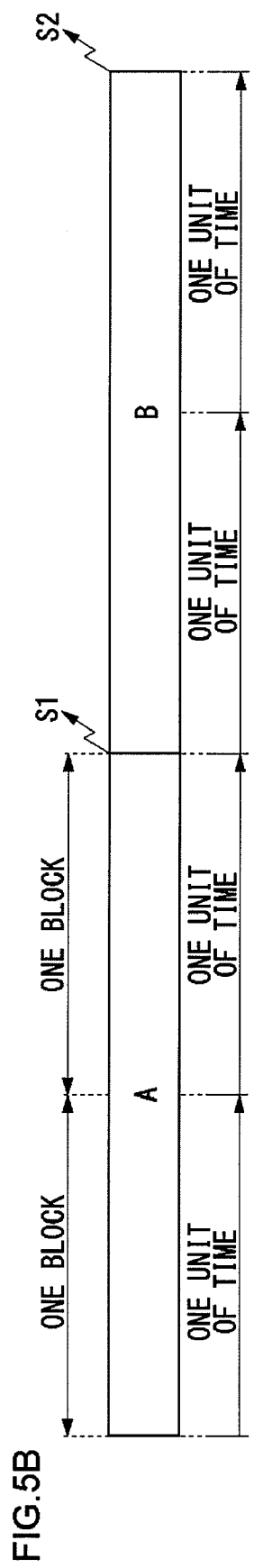
Figure 5C:
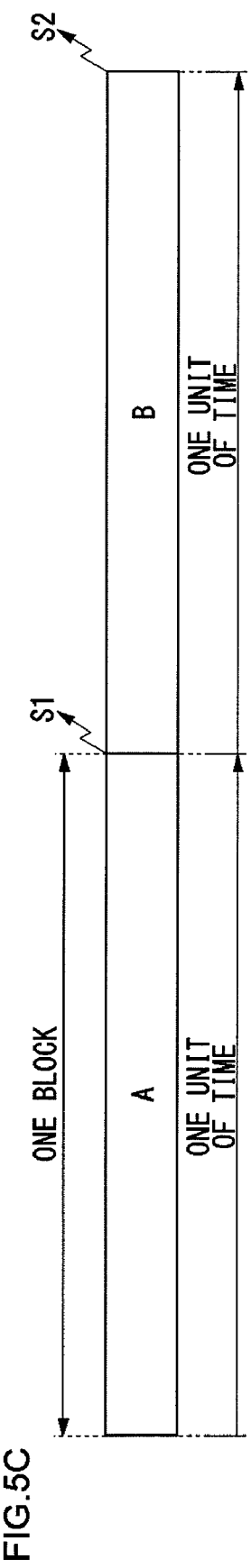

FIG. 5A to FIG. 5C are diagrams for explaining the case where the size of each of the buffers constituting the ring buffer is adjusted to the quadruple sampling frequency. The ring buffer includes two buffers each having a size where only one block of audio data (128 samples) having the quadruple sampling frequency is stored.

In the case where the audio data having the basic sampling frequency is buffered in the above ring buffer, four blocks of audio data are stored in each of the buffers A and B, as shown in FIG. 5A. It takes four units of time to read the four blocks of audio data in the first buffer A. After the reading of the four blocks of audio data is completed, the first buffer A is in the empty state. Then, the first interrupt signal S1 is generated and the data transfer is initiated by the CPU 10. The CPU 10 will write four new blocks of audio data into the first buffer A, while the data input/output unit 34 is reading the next four blocks of audio data from the second buffer B.

If this ring buffer is employed, the interrupt signal will be generated only in every four units of time. This does not allow the CPU 10 to start writing a new audio data block, until the four units of time elapses. To put in other words, the data input/output unit 34 always reads and outputs the audio data that is older by four units of time. In the case where one unit of time is equal to 667 microseconds, four units of time is equal to 2.67 microseconds. The situation where the audio older by as much as 2.67 milliseconds is reproduced will not sufficiently meet the needs for real-time performance in a real-time application such as a game, chatting, teleconferencing, etc.

In the case where the audio data of the double sampling frequency is buffered in the above ring buffer, two blocks of audio data are stored in each of the buffers A and B, as shown in FIG. 5B. It takes two units of time to read the two blocks of audio data in the first buffer A. After reading of the two blocks of audio data is completed, the first buffer A is in the empty state. Then, the first interrupt signal S1 is generated. Therefore, the audio data that is older by two units of time will be reproduced.

In the case where the audio data having the quadruple sampling frequency is buffered in the above ring buffer, one block of audio data is stored in each of the buffers A and B, as shown in FIG. 5C. The interrupt signals S1 and S2 are respectively generated in every unit of time. Therefore, the delay over one unit of time will not occur.

As described above, the frequency of the interrupt signal generated can be suppressed by adjusting to increase the size of each of the buffers constituting the ring buffer to the quadruple sampling frequency. However, if the buffer of thus increased size is employed for buffering the audio data having the basic or double sampling frequency, the generation of the interrupt signal will be insufficient, the frequency of refreshing the buffer will be decreased, and the real-time performance will be degraded.

In consideration of the above problems, according to an embodiment of the present invention, the interrupt signal is decimated in accordance with the target sampling frequency, whereas the size of each buffer constituting the ring buffer is adjusted to the basic sampling frequency. This prevents the increase of latency caused by frequently generated interrupt signals without sacrificing the real-time performance. A description will now be given, with reference to FIG. 6A to FIG. 6C, of the process of decimating the interrupt signals according to the present embodiment.

Figure 6A:
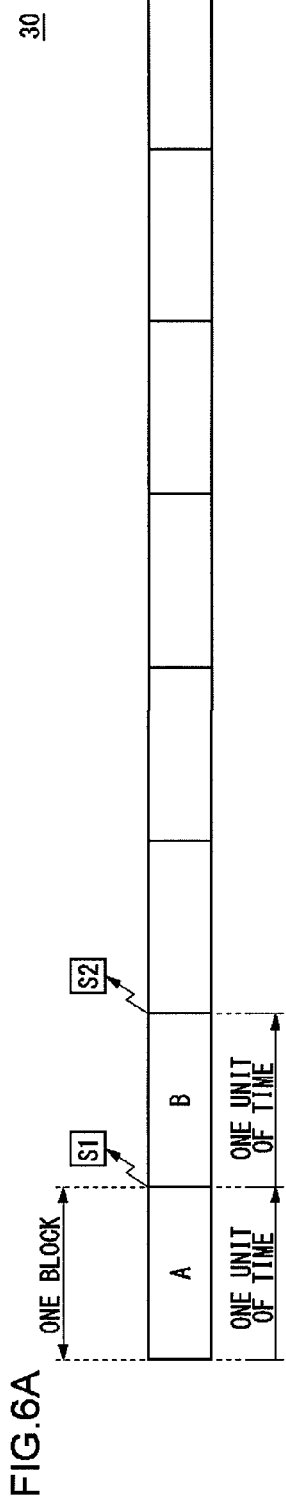
FIG. 6A through FIG. 6C show a decimation process for reducing the interrupt signals according to an embodiment of the present invention.
Figure 6B:
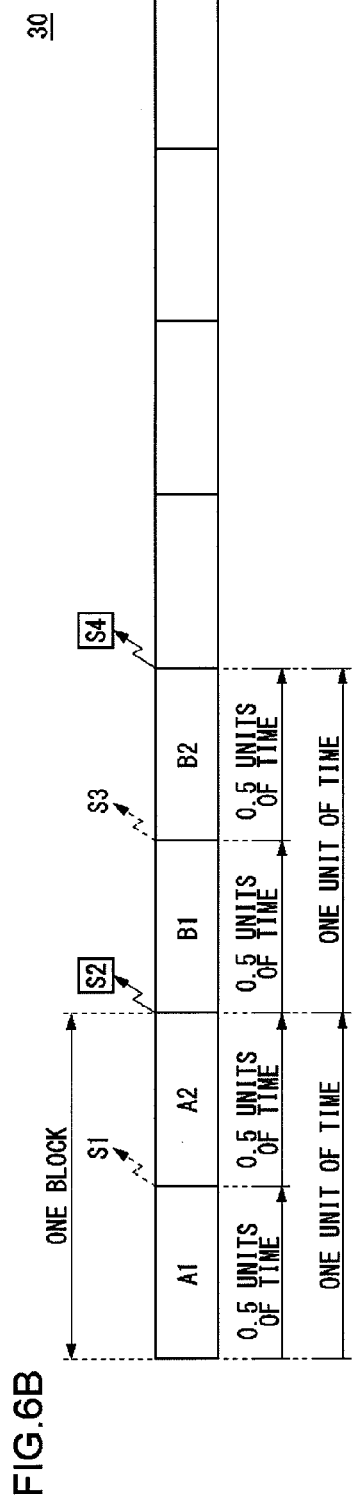
Figure 6C:
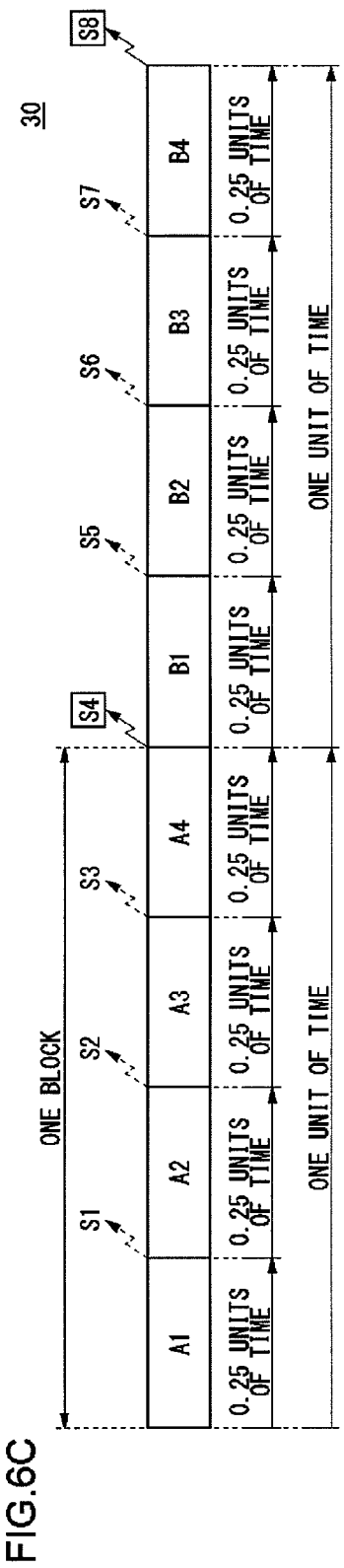

Referring now to FIG. 6A to FIG. 6C, the ring buffer 30 according to the present embodiment has eight buffers in a similar manner to those shown in FIG. 4A to FIG. 4C. Each buffer has a size where only one block of audio data (32 samples) having the basic sampling frequency can be stored. The methods of buffering audio data at the basic sampling frequency, the double sampling frequency, and the quadruple sampling frequency are same as those described with reference to FIG. 4A to FIG. 4C.

In the case where the audio data having the basic sampling frequency is buffered in the ring buffer 30, as shown in FIG. 6A, one block of audio data retained in each of the buffers A and B is read out in one unit of time. When each of the buffers A and B is in the empty state, the interrupt signals S1 and S2 are generated. In the basic sampling frequency, since the decimation mode setting unit 22 sets the decimation mode to "1 mode", the interrupt signals S1 and S2 are fed to the CPU 10 without being subject to the decimation.

In the case where the audio data having the double sampling frequency is buffered in the ring buffer 30, the decimation mode setting unit 22 sets the decimation mode to "½ mode". Referring now to FIG. 6B, one block of audio data retained in the initial two buffers A1 and A2 is read out in one unit of time and the interrupt signals S1 and S2 are successively generated in every 0.5 units of time, in the same manner as shown in FIG. 4B. However, the interrupt signal generator 26 decimates the first interrupt signal S1 generated when 0.5 units of time elapsed, whereas only the second interrupt signal S2 generated when one unit of time elapsed is extracted and fed to the CPU 10. Likewise, in the next two buffers B1 and B2, the third interrupt signal S3 is decimated, whereas only the fourth signal S4 is fed to the CPU 10.

As described above, the interrupt signal generator 26 extracts one out of two interrupt signals and feeds the signal to the CPU 10 as an actual interrupt signal, in the ½ mode. The above decimation process makes it appear to the CPU 10 as if there is one buffer that stores one block including 64 samples rather than there are two separate buffers A1 and A2. That is to say, it appears to the CPU 10 as if the buffer size is doubled as shown in FIG. 3B, and since an actual interrupt signal is generated in every unit of time, there is no useless traffic on the interrupt signal.

In the case where the audio data having the quadruple sampling frequency is buffered in the ring buffer 30, the decimation mode setting unit 22 sets the decimation mode to "¼ mode". Referring to FIG. 6C, one block of audio data retained in the initial four buffers A1 through A4 is read out in one unit of time and the interrupt signals S1 through S4 are successively generated in every 0.25 units of time, in the same manner as shown in FIG. 4C. However, the interrupt signal generator 26 decimates the first through third interrupt signals S1 through S3 generated whenever 0.25 units of time elapses, whereas only the fourth interrupt signal S4 generated when one unit of time elapsed is extracted and fed to the CPU 10. Likewise, the fifth through seventh interrupt signals S5 through S7 are decimated, whereas only the eighth signal S8 is fed to the CPU 10, in the next two buffers B1 through B4.

As described above, the interrupt signal generator 26 extracts one out of four interrupt signals and feeds the extracted signal to the CPU 10 as an actual interrupt signal in the ¼ mode. The above decimation process makes it appear to the CPU 10 as if the buffer size is quadrupled as shown in FIG. 3C and only one actual interrupt signal is generated in every unit of time.

In order to perform the above decimation process, a three-bit binary counter can be used in the case of the quadruple sampling frequency. Every time the interrupt signal indicating that the buffer is empty is received, the binary counter is incremented by one. By configuring a logic circuit such that the interrupt signal is permitted only in a case where the lower two bits are both 1, but is cancelled in the other cases, one out of four interrupt signals is extracted and fed to the CPU 10. A two-bit binary counter is used in the case of the double sampling frequency. By configuring a logic circuit such that the interrupt signal is output only in a case where the lower bit is 1. This allows one out of two interrupt signals to be extracted and fed to the CPU 10.

As described heretofore, according to an embodiment of the present invention, the interrupt signal generated when the audio buffer is in the empty state or in the full state is decimated in accordance with the sampling frequency. Thus, even when audio data of various sampling frequencies is output or input, unnecessary generation of the interrupt signal is eliminated, thereby preventing the degradation of the data transfer efficiency caused by frequently generated interrupt signals.

The description of the invention given above is based upon an embodiment. The embodiment is illustrative in nature and various variations in constituting elements and processes involved are possible. Those skilled in the art would readily appreciate that such variations are also within the scope of the present invention.

In the above embodiment, a description is given of input/output of audio data. However, the present invention is not limited to audio data, and may be applicable to input/output of another type of data. For example, data is, in some cases, transferred between a processor and a coprocessor and processed, in a system where a bus couples the processor for performing the common process and the coprocessor for performing the dedicated process such as an input/output process with an external device. The interrupt signals are provided from the coprocessor to the processor over the interrupt signal line, thereby causing the problem of latency in processing the interrupt signals. Also, in such case, the interrupt signals of buffer empty or buffer full are decimated in accordance with the speed for inputting/outputting the data block on the coprocessor, and the interrupt signals that survive the decimation are fed to the processor by using the decimation process according to an embodiment of the present invention. Thus, the traffic of the interrupt signals can be reduced and the degradation of the data transfer efficiency can be prevented.

What is claimed is:

1. An information processing apparatus in which a processor and an audio processing unit are coupled by a bus, wherein the audio processing unit comprises:

a ring buffer which includes a plurality of buffers for temporarily storing audio data to be output to an external destination; and an interrupt signal generator which changes a rate of decimating interrupt signals, each of which indicates that the data is output from a buffer in the ring buffer and the buffer is in an empty state, in accordance with a change in a sampling frequency of the audio data to be output to the external destination, and supplies the interrupt signals that survive the decimation to the processor; and wherein the processor issues a data transfer instruction for writing the audio data into the buffer in the empty state in the ring buffer, when receiving the interrupt signal that survives the decimation.

2. The information processing apparatus according to claim 1, wherein the interrupt signal generator increases a decimation rate, as the sampling frequency increases.

3. The information processing apparatus according to claim 1, further comprising a mode setting unit which selects a decimation mode out of a plurality of decimation modes each having a specific decimation rate of the interrupt signal for each candidate of the sampling frequency, in accordance with the sampling frequency of the audio data being currently processed, and thereby sets the decimation rate of the interrupt signal generator.

4. The information processing apparatus according to claim 1, wherein the size of the buffer constituting the ring buffer is set to an amount that stores one block of the audio data having the lowest sampling frequency out of candidates of the sampling frequency.

5. An information processing apparatus in which a processor and an audio processing unit are coupled by a bus, wherein the audio processing unit comprises:
   a ring buffer which includes a plurality of buffers for temporarily storing audio data to be input from an external source; and
   an interrupt signal generator which changes a rate of decimating interrupt signals, each of which indicates that the data is input into a buffer in the ring buffer and the buffer is in a full state, in accordance with a change in a sampling frequency of the audio data to be input from the external source, and supplies the interrupt signals that survive the decimation to the processor; and
   wherein the processor issues a data transfer instruction for reading the audio data from the buffer in the full state in the ring buffer, when receiving the interrupt signal that survives the decimation.

6. The information processing apparatus according to claim 5, wherein the interrupt signal generator increases a decimation rate, as the sampling frequency increases.

7. The information processing apparatus according to claim 5, further comprising a mode setting unit which selects a decimation mode out of a plurality of decimation modes each having a specific decimation rate of the interrupt signal for each candidate of the sampling frequency, in accordance with the sampling frequency of the audio data being currently processed, and thereby sets the decimation rate of the interrupt signal generator.

8. The information processing apparatus according to claim 5, wherein the size of the buffer constituting the ring buffer is set to an amount that stores one block of the audio data having the lowest sampling frequency out of candidates of the sampling frequency.

9. An audio processing apparatus coupled to a processor by a bus, comprising:
   a ring buffer which includes a plurality of buffers for temporarily storing audio data to be output to an external destination; and
   an interrupt signal generator which changes a rate of decimating interrupt signals, each of which indicates that the audio data is output from a buffer in the ring buffer and the buffer is in an empty state, in accordance with a change in a sampling frequency of the audio data to be output to the external destination, and supplies the interrupt signals that survive the decimation to the processor; and
   wherein the audio data is written into the buffer in the empty state in the ring buffer, in accordance with a data transfer instruction issued by the processor which has received the interrupt signal that survives the decimation.

10. An audio processing apparatus coupled to a processor by a bus, comprising:
   a ring buffer which includes a plurality of buffers for temporarily storing audio data to be input from an external source; and
   an interrupt signal generator which changes a rate of decimating interrupt signals, each of which indicates that the audio data is input into a buffer in the ring buffer and the buffer is in a full state, in accordance with a change in a sampling frequency of the audio data to be input from the external source, and supplies the interrupt signals that survive the decimation to the processor; and
   wherein the audio data is read from the buffer in the full state in the ring buffer, in accordance with a data transfer instruction issued by the processor which has received the interrupt signal that survives the decimation.

* * * * *